US010792906B2

United States Patent
Illston

(10) Patent No.: US 10,792,906 B2
(45) Date of Patent: Oct. 6, 2020

(54) ADDITIVE MANUFACTURING

(71) Applicant: Siemens Aktiengesellschaft, Munich (DE)

(72) Inventor: Trevor Illston, Worcester (GB)

(73) Assignee: SIEMENS AKTIENGESELLCHAFT, Munich (DE)

( * ) Notice: Subject to any disclaimer, the term of this patent is extended or adjusted under 35 U.S.C. 154(b) by 883 days.

(21) Appl. No.: 15/074,617

(22) Filed: Mar. 18, 2016

(65) Prior Publication Data

US 2016/0271699 A1 Sep. 22, 2016

(30) Foreign Application Priority Data

Mar. 18, 2015 (GB) .................... 1504603.0

(51) Int. Cl.
*B22F 3/105* (2006.01)
*B22F 7/02* (2006.01)
*B33Y 10/00* (2015.01)

(52) U.S. Cl.
CPC ............ *B33Y 10/00* (2014.12); *B22F 3/1055* (2013.01); *B22F 2003/1058* (2013.01); *Y02P 10/295* (2015.11)

(58) Field of Classification Search
CPC .......... B22F 2003/1058; B22F 3/1055; B33Y 10/00; Y02P 10/295
See application file for complete search history.

(56) References Cited

U.S. PATENT DOCUMENTS

2013/0312928 A1\* 11/2013 Mercelis ............... B22F 3/1055
164/492

\* cited by examiner

*Primary Examiner* — Colleen P Dunn
*Assistant Examiner* — Anthony M Liang
(74) *Attorney, Agent, or Firm* — Wolter Vandyke Davis, PLLC

(57) ABSTRACT

A method of additive manufacturing metal components includes selecting a first component to be formed in a layer-by-layer process, and providing at least a second component to be formed in the same layer-by layer process. The components being selected such that the stresses created in the components during additive manufacturing are substantially balanced. The method further includes separating the components after completion of the layer-by-layer process.

14 Claims, 3 Drawing Sheets

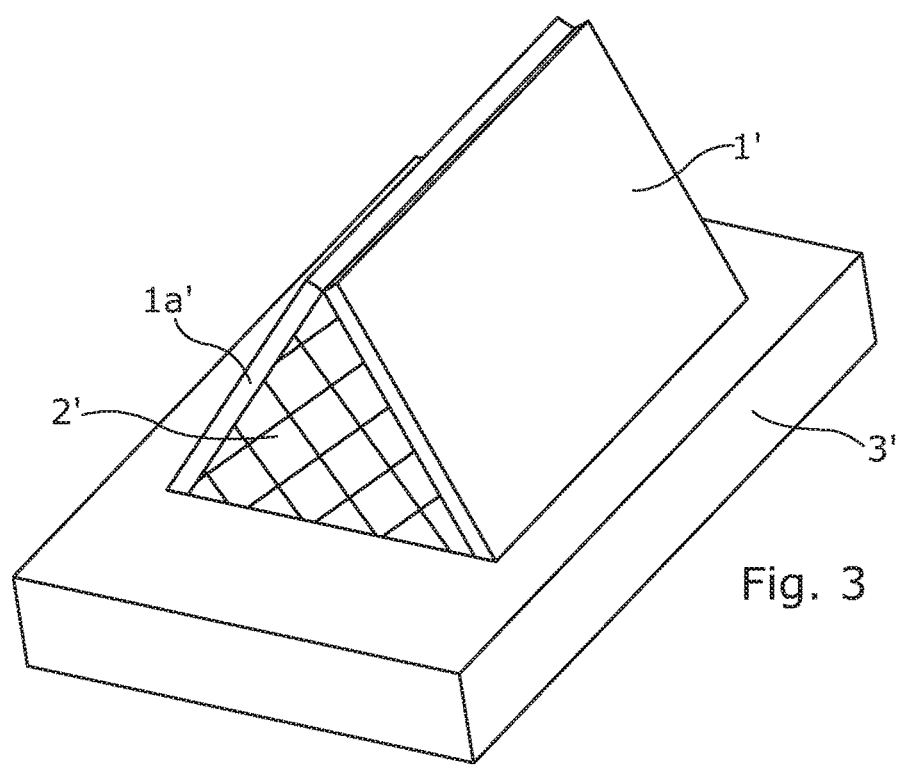
Fig. 3
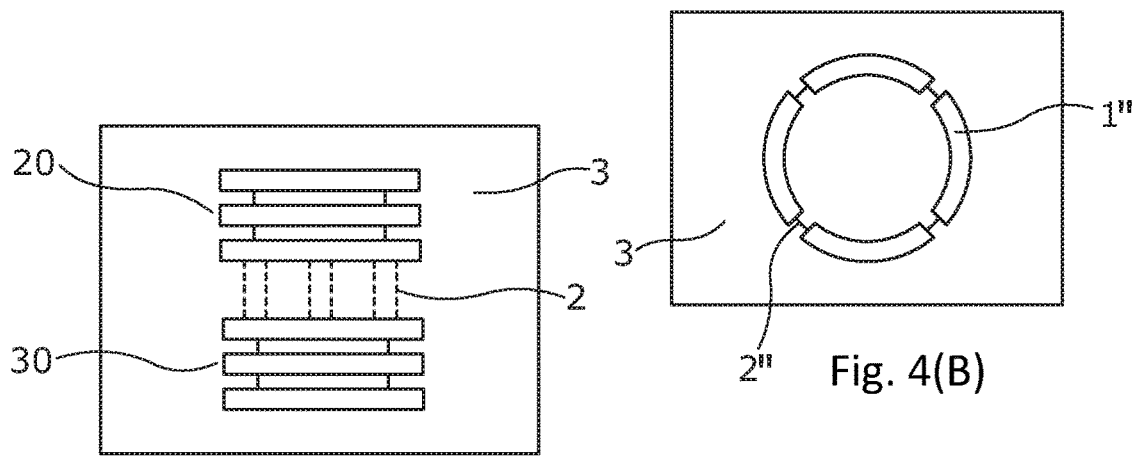
Fig. 4(A)
Fig. 4(B)
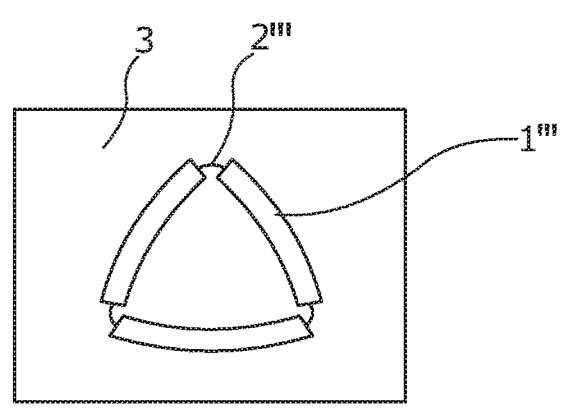
Fig. 4(C)

ADDITIVE MANUFACTURING

BACKGROUND

The present invention relates to methods of additive manufacturing of metal parts using a powder bed.

Additive Manufacturing is a group of processes characterised by manufacturing three-dimensional components by building up substantially two-dimensional layers (or slices) on a layer by layer basis. Each layer is generally very thin (for example between 20 to 100 microns) and many layers are formed in a sequence with the two dimensional shape varying on each layer to provide the desired final three-dimensional profile. In contrast to traditional "subtractive" manufacturing processes where material is removed to form a desired component profile, additive manufacturing processes progressively add material to form a net shape or near net shape final component.

The earliest Additive Manufacturing processes, such as Stereolithography, were based upon the curing of photopolymers using UV light and several techniques exist for forming plastic parts (including so called "3D printing" which is typically used to refer to Additive Manufacturing of plastics based upon modified inkjet type printing methods).

The Additive Manufacturing of metals presents significantly different issues to that of plastics and may be considered a distinct field by those skilled in the art. Metal Additive Manufacturing techniques are based upon melting or sintering metal on a layer-by layer basis and include methods described and/or trade marked as 'selective laser sintering', laser Cusing (a trade mark), DMLS (a trade mark, sometimes referred to as 'direct metal laser sintering'), and Selective Laser Melting. Such techniques utilise a powder bed in which the metal desired components are formed. It is worth noting that 'sintering' should strictly be used to refer to a processes in which the metal powder is fused (sintered) but not fully melted however the terminology in the field is not consistent and, therefore, the established term "selective laser sintering" may sometimes be used to refer to processes in which there is full melting of the metal powder.

Examples of typical selective laser machines include the EOS M270/280/290 series (produced by EOS GmbH) and similar. Powder bed selective laser manufacturing, as it is currently practiced in the art may be generally characterised by the following characteristics:

1. The process operates at a bulk powder temperature which is substantially lower than the melting point of the alloy of the powder (and generally significantly lower). This is in contrast to, for example, electron beam additive processes (such as those carried out in equipment produced by Arcam AB) where the powder bed is generally pre heated layer by layer to a temperature where substantially all the powder layer sinters and a higher power level is applied selectively to melt a part of that layer.

2. As the powder feedstock selectively melted by the laser during the manufacturing process cools and solidifies to create a continuous whole, residual stresses are produced in the component. These stresses are the result of the shrinking of the metal during cooling (and occurs in almost all metal alloys). These stresses may be significant as the metal alloys of most commercial interest are generally high strength materials (unlike polymers in other Additive processes). Accordingly the stresses caused during shrinking may be so strong that they cause distortion of the part by the process and/or cracking of the metal part either during or subsequent to the Additive process.

Thus, there is a need for improved methods of Additive Manufacturing which prevent or minimise geometric distortion and or cracking of the part.

This problem is particularly difficulty using existing techniques when manufacturing parts which are substantially a "2D structure" (with thickness) such as 'walls' or 'plates'. A known approach to address this problem is to add support structures to stabilise such geometries to assist in building them accurately. However, these support structures are sacrificial and take up scarce resources in their design, construction by the Additive Manufacturing process, and subsequent removal.

SUMMARY

According to a first aspect of the invention there is provided a method of additive manufacturing metal components, the method comprising the steps of:

selecting a first component to be formed in a layer-by-layer process;

providing at least a second component to be formed in the same layer-by layer process, wherein the components are selected such that the stresses created in the components during additive manufacturing are substantially balanced; and wherein the method further comprises separating the components after completion of the layer-by-layer process.

It may be appreciated that in the context of embodiments of the invention, substantially balancing the stresses created in the component during additive manufacture (i.e, the inherent stress resulting from the additive manufacturing of metal components) may mean that the stresses in the different components are generally opposed to one another. Thus, the stresses in the plurality of components manufactured in the same layer-by-layer process, in accordance with embodiments, may combine to reduce or alleviate the stress in each individual component. Thus, embodiments may greatly reduce the amount of other support structure required during manufacture.

The step of selecting the components may, for example, comprise selecting the orientation, alignment and/or geometry of the components to provide an optimal mutual support during additive manufacture. For example the orientation, alignment and/or geometry of the components may be selected to provide the minimum additional support structure. Alternatively, or additionally, the orientation, alignment and/or geometry of the components may be selected to maximise the mutual support provided by the components, for example by providing substantially equal and opposing forces. For example the components may be configured in a group or pair of components.

In some embodiments, for example, a pair of components may be manufactured and the orientation, alignment and/or geometry of the second component may be selected such that the stresses created in the second component during manufacturing are generally equal but opposite to those created in the first component. Multiple such paired components could for example be formed in a single process. In some embodiments a pair components could additionally or alternatively comprise a pair of grouped components (for example the first component may comprise a first group of components and the further balanced component may comprise a further group of components.

It will be understood that the first and second components are generally produced "simultaneously" on a layer-by-layer basis (i.e. in each layer of the process features of both the first and second component would typically be produced).

The stress created in the first and second component during the manufacturing process may be substantially balanced. This is in contrast to existing methods in which sacrificial structures (or "scaffolding") are provided to support the structure by resisting distortion due to stresses formed in the component during manufacturing but will not themselves be formed with stresses which substantially balance those of the component being manufactured. As such, the invention is partially based upon the inventor's recognition that providing a balanced pair of structures in effect allows a substantially "2D" structure such as walls or plates to be manufactured in a similar manner to existing tubular forms. It will be appreciated by those skilled in the art that tubular forms, such as barrels, tubes, cups etc. or balls, retain their shape well as the tensile stress creates a hoop stress that stabilises its geometry. In contrast forms which do not enclose an unmelted middle section formed by existing methods are more prone to distortion.

The first and second components may be connected by linking structures. The linking structures may typically be manufactured on a layer-by-layer basis with the components. The linking structures may be sacrificial. The provision of such linking structures may aid the separation of the components after manufacturing. This is particularly advantageous if both components are parts which are being manufactured as the linking structure can be removed without altering the overall/intended shape and geometry of either of the first or second component. The linking structures may be less than 10% of the size of the components being manufactured (and may even be less than 5% of the size).

The first and second components may be substantially identical. The first and second components may be symmetrical about a nominal centreline. For example a nominal centreline may extend perpendicular to the planes of the layers in which the process is carried out (which may be perpendicular to a substrate). It will be appreciated that identical components provide a particularly convenient manner of producing equal and opposing stresses.

Whilst the second component could be sacrificial it will be appreciated that this will ideally be avoided to reduce wastage of material and manufacturing cost/time. Therefore, both the first and second component may comprise one of a plurality of parts being produced by the method of additive manufacturing.

The components may be treated (for example heat treated) to remove residual stress at the end of the layer-by-layer process. The first and second components may be treated to remove residual stress prior to the step of separating the components.

The first and second components are generally formed on a common substrate. The first and second components are generally formed upon a foundation structure—such an extrusion of their thickness to provide a layer through which the components may be cut from the substrate—in turned formed on the substrate during the initiation of the layer-by-layer processing. The first and second parts may be treated to remove residual stress prior to the removal from the common substrate.

Multiple parts may be formed in a single additive process. As such, a plurality of pairs of first and second components may be produced during a single process (i.e. simultaneously on a layer-by-layer basis).

The method of Additive Manufacturing a metal component comprises powder bed selective laser manufacturing. More specifically, the method may be selective laser melting in the sense that the metal is melted to form a substantially fully dense material (since in strict sintering processes the problematic stress build up is less important as the material does not reach full strength during the layer-by-layer process). The powder bed is at a substantially lower temperature than the melting point of the metal powder.

Whilst the invention has been described above, it extends to any inventive combination of features set out above or in the following description or drawings.

BRIEF DESCRIPTION OF THE DRAWINGS

Specific embodiments of the invention will now be described in detail, by way of example only, and with reference to the accompanying drawings in which:

FIG. 3 is a schematic representation of a further pair of components manufactured in accordance with an embodiment of the invention; and FIGS. 4(A), 4(B) and 4(C) schematically show plan views of alternate component arrangements which could be utilised in accordance with embodiments of the invention.

DETAILED DESCRIPTION OF EMBODIMENTS

Figure 1:
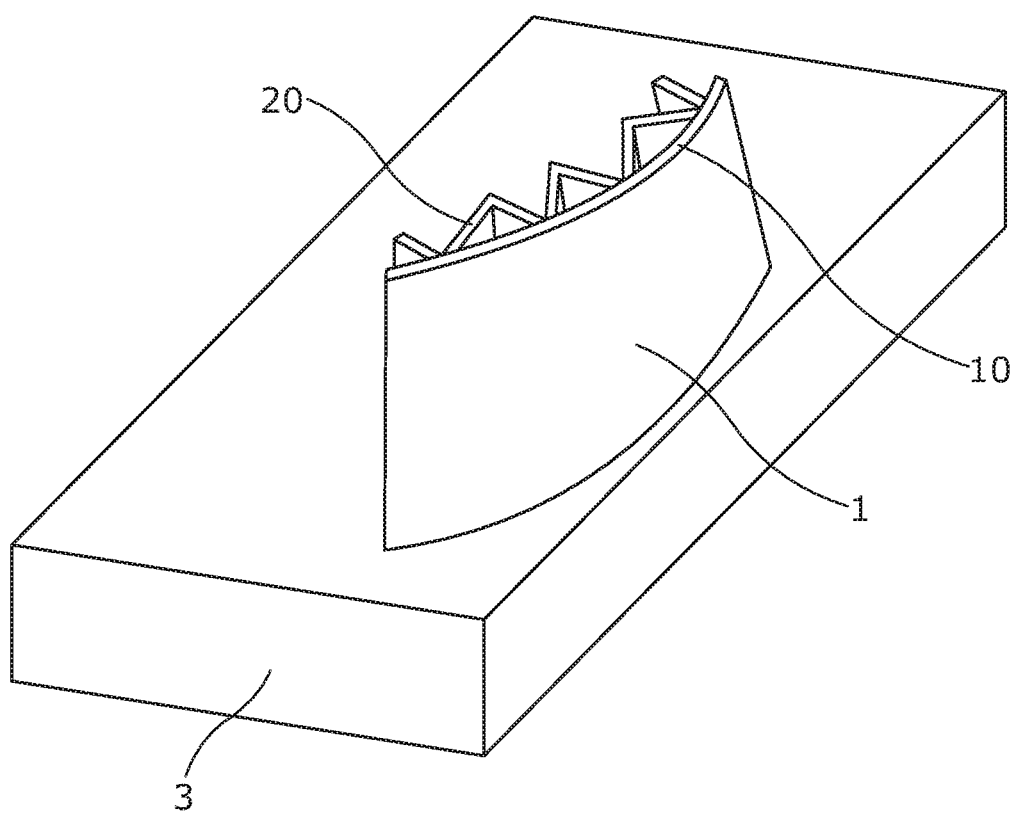
FIG. 1 is a schematic representation of a part manufactured by an existing method.

A schematic representation of a metal part 1 manufactured in an additive manufacturing method is shown schematically in FIG. 1. The preferred embodiment uses a power bed Selective Laser Melting process for the layerwise building of the part on a baseplate. Such Selective Laser Melting processes may be practiced in commercially available equipment available under several names, for example in EOS M270 and M280 'DMLS' equipment, Concept Laser M1, M2 and M3 'Cusing' equipment, and the Selective Laser Melting equipment of SLM Solutions and Renishaw (MU). The process—as it is presently operated—is known by many names but is distinguished from 'sintering' in that a high beam quality is used to melt the powder fully to create a nominally fully dense part, whereas previously a sintering of metal powder was only possible with e.g. a CO2 laser thereby creating a part that was less than 99% dense. Selective Laser Melting (SLM) if used here, is used as a generic description of these and similar machines and the processes they operate.

For practical reasons, such Selective Laser Melting (SLM) equipment does not generally apply any significant heating of the metal powder bed. This enables the handling of the parts and powder bed immediately after completion of build and simplifies the building machinery. Heating of the powder bed is therefore generally to below 100° C. and primarily to speed the degassing of the powder and stabilise the process temperature (And it will be appreciated that this temperature is not significant in comparison to the melting temperatures during the processing).

A part 1, having only a limited thickness 10, is desired to be made by the SLM process upon a baseplate 3 as is known in the art. The limited thickness of the part 1 means that at least in respect of the stresses created during manufacturing it may be considered to be a substantially "2D" part. It will be appreciated that the (removable) baseplate 3 is required to resist mechanical relaxation of the parts during and after building (which would otherwise cause mechanical distortion), to allow the first layers of metal powder to wet to a solid surface to prevent them beading under surface tension and to enable the parts built to be removed from the machine.

Due to the substantially 2D profile of the part 1, there is a significant risk of distortion during or subsequent to the SLM process (until stress relieved). Therefore, as shown in FIG. 1, a support structure 20 in the form of a "scaffolding" is formed with the component and arranged to resist or prevent distortion of the part 1. The support structure 20 may be relatively complex and uses significant material and or manufacturing resource. In fact, in some geometries the mass of a conventional support structure may even exceed the mass of the part being built.

Figure 2:
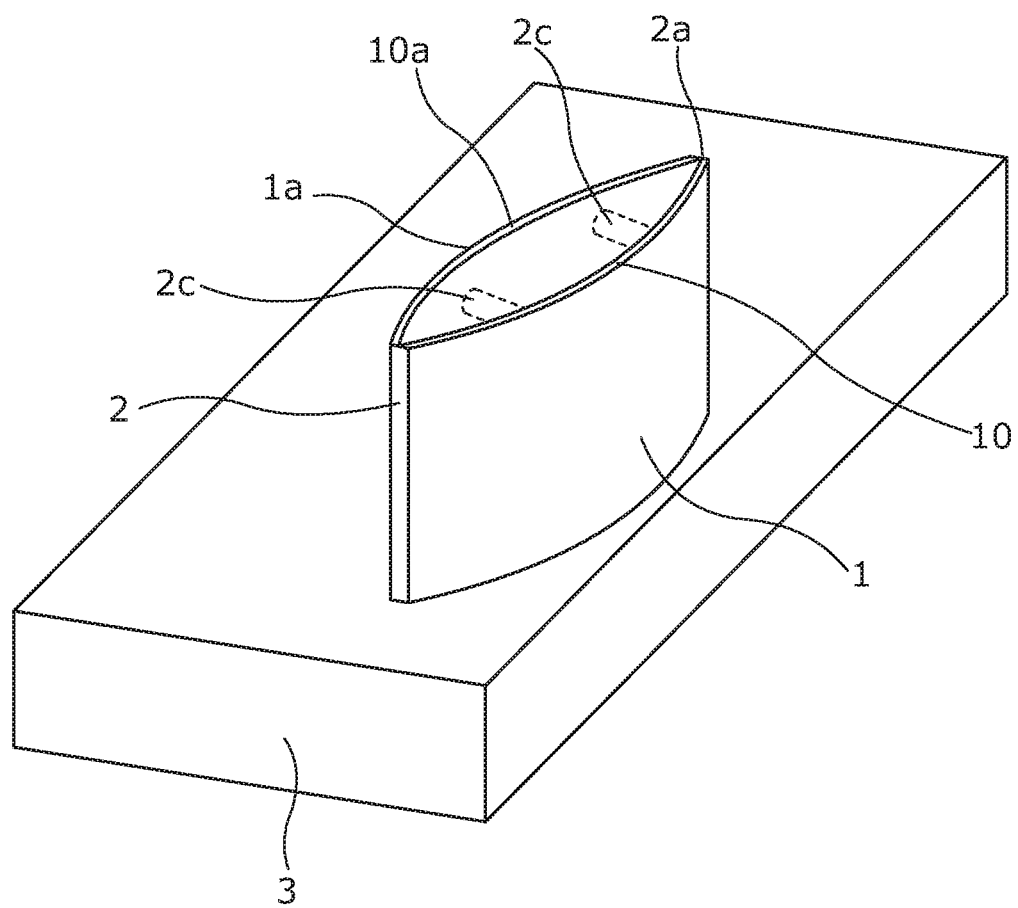
FIG. 2 is a schematic representation of a pair of components manufactured in accordance with an embodiment of the invention.

As shown schematically in FIG. 2, in embodiments of the invention an "antagonistic" pairing is created with the part 1 and an identical, or substantially similar, part 1*a*. The parts 1, 1*a* are joined by minimal sacrificial connecting forms 2, 2*a*. As the parts 1 and 1*a* are aligned in opposing directions (they are essentially mirrored about a nominal centreline) and have identical (or substantially identical) profiles it will be appreciated that the stress created by the layerwise process will be substantially equal and opposite in the two components both as they build and also after building has completed. By connecting the parts 1, 1*a* together to effectively initially form a unitary part the forces may balance and prevent distortion or cracking of the parts.

The parts 1, 1*a*, and connecting pieces 2, 2*a* are formed in a single layer-by-layer process (as is well known in the art) by the layerwise additive process upon the baseplate 3. In other words, during each layer of the layer-by-layer process features of each of the parts 1, 1*a* and connecting forms 2, 2*a* are formed. In addition to or alternative to the connecting pieces 2, 2*a* provided at the edges of the parts 1, 1*a* connecting pieces 2*c* (shown in hashed outline) may be provided extending across the space between the parts and providing a load transferring connection therebetween. In some cases the supports may even extend through apertures in a part (for example to connect to a separate surface of the part of to connect multiple parts). It will be appreciated that the position and geometry of the connecting pieces may be optimised depending upon the stress and/or geometry of the part 1, 1*a*.

On completion the baseplate 3 with 1, 1*a*, 2, 2*a* upon it are removed from the additive layer building machine, such as an EOS M280. The parts are then treated to provide stress relieve whilst still attached to one another and the base. For example the stress may be relieved by a heat treatment.

Once the stress is substantially removed by this post build treatment the parts 1, 1*a* can be separated by cutting within parts 2,2*a* and any remaining parts of 2, 2*a* removed to leave parts 1,1*a* completed.

What embodiments of the invention provide is a means to balance stresses created by the process in one part with similar and opposing stresses in another part or parts. And whilst 2 parts 1, 1*a* are shown in the illustrated embodiment, it will be appreciated that any number of parts may be produced in such a manner. For example a plurality of paired parts may be manufactured.

Instead of being a second desired part 1*a*, the second part 1*a* could be formed as a sacrificial piece (but with a stress balanced approach in accordance with embodiments of the invention). However, this would provide less reduction of material usage than the illustrated arrangement in comparison to the prior art "scaffolding" approach.

It should be noted that the connecting pieces 2, 2*a* are substantially smaller than the part itself, typically less than 10% as large, and preferably 5% or less.

FIG. 3 schematically shows an alternative build approach which could be used in accordance with embodiments of the invention. In this arrangement two (substantially planar, wall type) components 1' and 1*a'* have been arranged on the substrate 3'. Rather than building the components in a substantially vertical arrangement, the components 1', 1*a'* are inclined inwardly towards one another with an orientation and alignment selected such that the top edges of the components may meet (and be joined) during the layer-by-layer manufacturing process. Rather than needing an extensive conventional support structure, the components support one another. Optionally, the components may also be provided with support structure 2 (which could be of any convenient form—for example a closed wall, a lattice or a series of discrete members) to provide further connection between the parts 1' 1*a'* and further support the parts during manufacture. As with the proceeding embodiment the supports 2 may simply be cut away and the components 1', 1*a'* separated at the end of the manufacturing process.

In the example of FIG. 3 the two components 1' 1*a'* (and support structure 2') effectively form a temporary 3*d* form which is substantially closed. This form is more suitable for sustaining the inherent stresses than a substantially planar structure. In the example shown the resulting temporary form is generally in the form of a prism, but other forms such as a pyramid or cuboid could equally be effective depending upon the shape of the component which it is desired to produce.

Although the invention has been described above with reference to a preferred embodiment, it will be appreciated that various changes or modifications may be made without departing from the scope of the invention as defined in the appended claims. In particular, where there are stresses sufficient to cause distortion of parts during any metal additive manufacturing process, the approach described here for selective laser melting may be applied.

For example, whilst the illustrated embodiment only shows two parts being formed, multiple parts may also be formed. The parts could be arranged in a plurality of pairs spaced about on the substrate. Alternatively a pair of groups of parts could be provided, with each group being comprised of a plurality of parts (in other words, the first and second component may each comprise a group of components). In the former case only the first and second component of the pair would be connected whereas in the latter case all of the parts in both groups may be connected.

Examples of alternate groupings are shown by way of example in FIG. 4. In FIG. 4(A), two discrete groups of components 20 and 30 have been arranged as opposing pairs with connections or support structure therebetween. The support structure may even extended beyond or through (for example when suitable apertures or perforations exist in the components) components within the same group to connect components of the other group.

In FIG. 4(B) a groups of four components 1" have been arranged such that they form a group with connecting structures 2" connecting their edges. The components, therefore, form a hoop or box type structure. The group could be four identical components or two pairs of two identical components. Likewise, FIG. 4(C) shows a grouping of three components 1''' arranged to support/balance the stresses during manufacturing.

What is claimed is:

1. A method of additive manufacturing metal components, the method comprising the steps of:

selecting a first component to be formed in a layer-by-layer process during which layers of a powder are melted iteratively to form a structure;

selecting at least a second component to be formed in the same layer-by layer process;

forming the structure, wherein the structure comprises the first component, the second component, and a linking arrangement connecting the first component and the second component simultaneously via the layer-by-layer process, wherein in a direction of buildup a last-formed end of the first component and a last-formed end of the second component extend above and are thereby not in direct contact with the linking arrangement; and separating the first component from the second component after completion of the layer-by-layer process;

wherein the structure is configured such that stresses formed in the first component are balanced by stresses formed in the second component.

2. The method of claim 1,
wherein the linking arrangement is sacrificial.

3. The method of claim 1,
wherein the structure comprises an additional component and a further additional component.

4. The method of claim 1,
wherein the first and second components are treated to remove residual stress prior to the step of separating the first and second components.

5. The method of claim 1,
wherein the first and second components are formed on a common substrate.

6. The method of claim 5, further comprising:
removing the first and second components from the common substrate;
wherein the first and second components are treated to remove residual stress prior to the removing the first and second components from the common substrate.

7. The method of claim 1, further comprising:
producing a plurality of pairs of the first component and the second component during a single process.

8. The method of claim 1,
wherein the layer-by-layer process comprises powder bed selective laser manufacturing.

9. A method of powder bed selective laser manufacturing of metal components, the method comprising the steps of:
forming a structure in a layer-by-layer process during which layers of a powder are melted iteratively;
wherein the structure comprises, in sequence along a closed curve shape of the structure, a first component, a first linking arrangement connected to the first component, a second component connected to the first linking arrangement, a second linking arrangement connected to the second component, a third component connected to the second linking arrangement, and a third linking arrangement connected to the third component; and
separating the first component, the second component, and the third component after completion of the layer-by-layer process;
wherein no part of the structure is formed within the closed curve shape during the layer-by-layer process.

10. The method of claim 9,
wherein the linking arrangements comprise sacrificial structures.

11. The method of claim 9,
wherein the structure is formed on a substrate.

12. The method of claim 10,
wherein the structure are formed on a substrate.

13. The method of claim 9, wherein each linking arrangement comprises a curved link.

14. A method of additive manufacturing metal components, comprising:
forming a first component, a second component, and a linking arrangement simultaneously in a layer-by-layer process during which layers of a powder are melted iteratively;
wherein a first-formed end of the first component is set apart from a first-formed end of the second component, wherein a last-formed end of the first component abuts or joins a last-formed end of the second component, and wherein the linking arrangement connects the first component to the second component; and
separating the linking arrangement from the first component and from the second component after completion of the layer-by-layer process.

* * * * *